US012000184B2

(12) United States Patent
Kleynerman

(10) Patent No.: US 12,000,184 B2
(45) Date of Patent: Jun. 4, 2024

(54) ELECTRONIC CARGO CONTAINER LOCKING MECHANISM

(71) Applicant: Gregory Kleynerman, Fox Point, WI (US)

(72) Inventor: Gregory Kleynerman, Fox Point, WI (US)

( * ) Notice: Subject to any disclaimer, the term of this patent is extended or adjusted under 35 U.S.C. 154(b) by 44 days.

(21) Appl. No.: 17/727,095

(22) Filed: Apr. 22, 2022

(65) Prior Publication Data

US 2023/0340807 A1 Oct. 26, 2023

(51) Int. Cl.

| | |
|---|---|
| ***E05B 83/02*** | (2014.01) |
| ***E05B 15/04*** | (2006.01) |
| ***E05B 47/00*** | (2006.01) |
| ***E05B 59/00*** | (2006.01) |
| ***E05C 19/00*** | (2006.01) |

(52) U.S. Cl.

CPC .............. *E05B 83/02* (2013.01); *E05B 15/04* (2013.01); *E05B 59/00* (2013.01); *E05C 19/003* (2013.01); *E05B 2047/0094* (2013.01)

(58) Field of Classification Search

CPC .......... E05B 83/02; E05B 15/04; E05B 59/00; E05B 17/0037; E05B 17/2038; E05B 2047/0094; E05B 63/20; E05B 63/202; E05B 63/18; E05B 63/185; E05C 19/003; Y10T 292/096; Y10T 292/0969; Y10T 292/1022; Y10T 292/1023; Y10T 292/1028

See application file for complete search history.

(56) References Cited

U.S. PATENT DOCUMENTS

| | | | | |
|---|---|---|---|---|
| 4,726,613 A * | 2/1988 | Foshee | E05B 65/104 | 292/167 |
| 2005/0144991 A1* | 7/2005 | Bravo | E05B 13/002 | 70/56 |
| 2009/0236864 A1* | 9/2009 | Ehrlich | E05C 19/003 | 292/217 |
| 2010/0326147 A1* | 12/2010 | Powers | G08B 25/10 | 70/164 |

* cited by examiner

*Primary Examiner* — Christine M Mills
*Assistant Examiner* — Yahya Sidky
(74) *Attorney, Agent, or Firm* — James Earl Lowe, Jr.

(57) ABSTRACT

A locking mechanism for a swinging door movable between a door closed position and a door open position and including a latch, the locking mechanism including a bolt housing, a movable bolt slidably mounted in the bolt housing, the movable bolt having a first end and second end, and a spring mounted in the bolt housing between the bolt second end and a portion of the bolt housing and biasing the bolt towards the bolt first end. The locking mechanism also includes a locking plate having a hole therein, the locking plate being slidably mounted in the bolt housing and movable between a bolt unlocked position where the locking plate hole is aligned with the bolt so that the bolt can move freely towards the bolt second end, and a bolt locked position where the locking plate hole is not aligned with the bolt and where the bolt movement toward the bolt second end is limited. The locking mechanism also includes a locking plate moving mechanism for moving the locking plate between its bolt locking position and its bolt unlocked position, the latch engaging the bolt first end and preventing the door from opening if the latch and the bolt first end cannot move past one another.

2 Claims, 17 Drawing Sheets

ELECTRONIC CARGO CONTAINER LOCKING MECHANISM

BACKGROUND

This disclosure pertains to electronic door latches, and more particularly, this disclosure pertains to containers or trailer bodies which are provided with swinging doors and door closing mechanisms of the vertical rotating bar type for locking the swinging doors.

Cargo containers often have swinging doors which are moved between open and closed positions and securely locked by means of vertical operating bars having conventional locking mechanisms consisting of levers for turning and locking the operating bars. The operating bars comprise solid rods or are of tubular construction.

SUMMARY

Disclosed is a locking mechanism for a swinging door movable between a door closed position and a door open position and including a latch, the locking mechanism including a bolt housing, a movable bolt slidably mounted in the bolt housing, the movable bolt having a first end and second end, and a spring mounted in the bolt housing between the bolt second end and a portion of the bolt housing and biasing the bolt towards the bolt first end. The locking mechanism also includes a locking plate having a hole therein, the locking plate being slidably mounted in the bolt housing and movable between a bolt unlocked position where the locking plate hole is aligned with the bolt so that the bolt can move freely towards the bolt second end, and a bolt locked position where the locking plate hole is not aligned with the bolt and where the bolt movement toward the bolt second end is limited. The locking mechanism also includes a locking plate moving mechanism for moving the locking plate between its bolt locking position and its bolt unlocked position, the latch engaging the bolt first end and preventing the door from opening if the latch and the bolt first end cannot move past one another.

Figure 1:
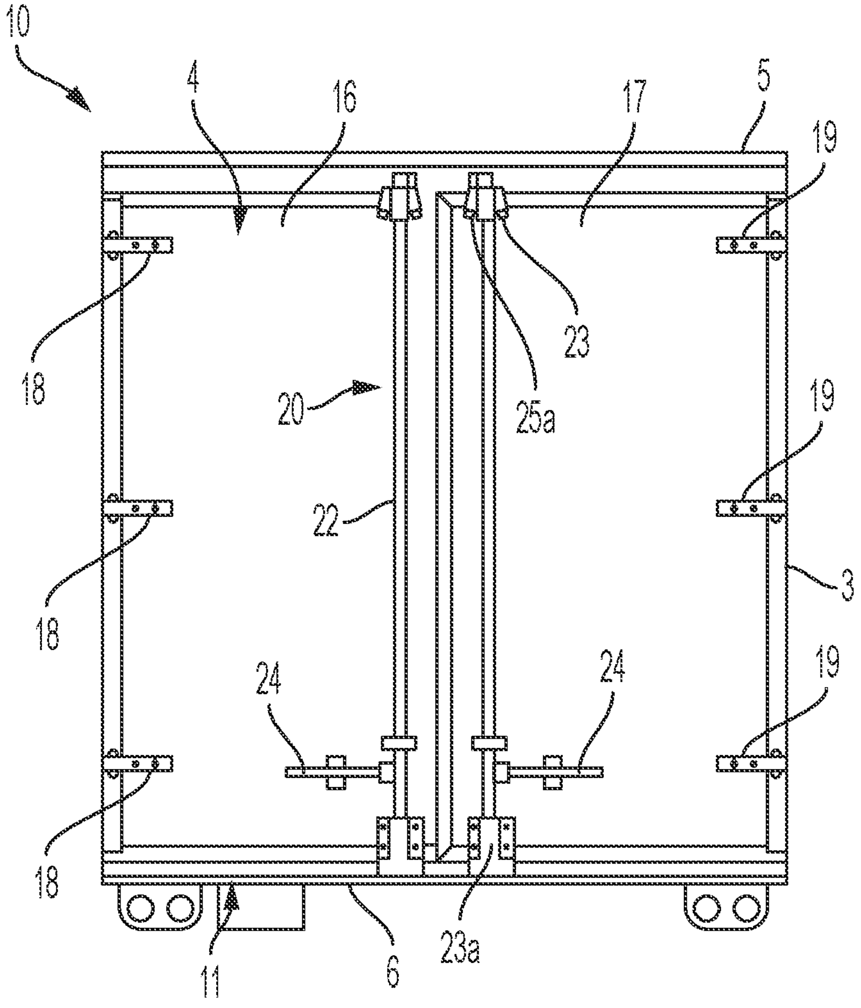
FIG. 1 PRIOR ART
FIG. 1 is a rear elevational view of a conventional container having swinging doors and a conventional door locking mechanism.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward" and "downward", etc., are words of convenience and are not to be construed as limiting terms.

DESCRIPTION OF THE PREFERRED EMBODIMENT

Referring to FIG. 1, a container or trailer body 10 is illustrated and includes an end frame structure 11 of conventional construction. An electronic cargo container locking mechanism 30 according to this disclosure can be used with any type of container utilized in the handling of cargo. Such containers may be mounted on an over-the-road chassis or on rail cars or may be an integral part of a trailer body. Such containers can also be shipped on cargo ships.

The container 10 includes inner vertical walls 3, a cargo loading opening 4, an inner upper wall 5, and a lower or bottom wall 6. The rear of the trailer body has conventional swinging doors 16-17 that are hinged at 18 and 19, respectively, for swinging outwardly about vertical axes in a door frame for loading or unloading the interior of the container 10. The door 16 is closed first and the door 17 which is closed thereafter overlaps the edge of the door 16 and holds that door against opening until the door 17 has been opened.

Each door has a conventional camming arrangement for forcing the door to its fully closed position and latching it in that position. The door latching structure is generally indicated at 20 and includes an axially rotatable vertical bar 22 suitably journaled in upper and lower plates 23 and 23*a* on the door and having a handle 24 secured thereto and carrying upper and lower cams that cooperate with keepers mounted on the upper and lower portions of the door frame of the trailer. The handle 24 is used to rotate the vertical bar 22 between a door locked position, where the handle is generally parallel to the door, and a door unlocked position, where the handle has been rotated out away from the door. The latching structure on the door 17 is the same as that on the door 16 except that the cams at the upper and lower ends of the respective bars 22 of the doors are respectively right and left-hand cams. When the door is being closed, the cams at the upper and lower ends of the bars 22 force the respective doors firmly into the door frame of the trailer.

Figure 3:
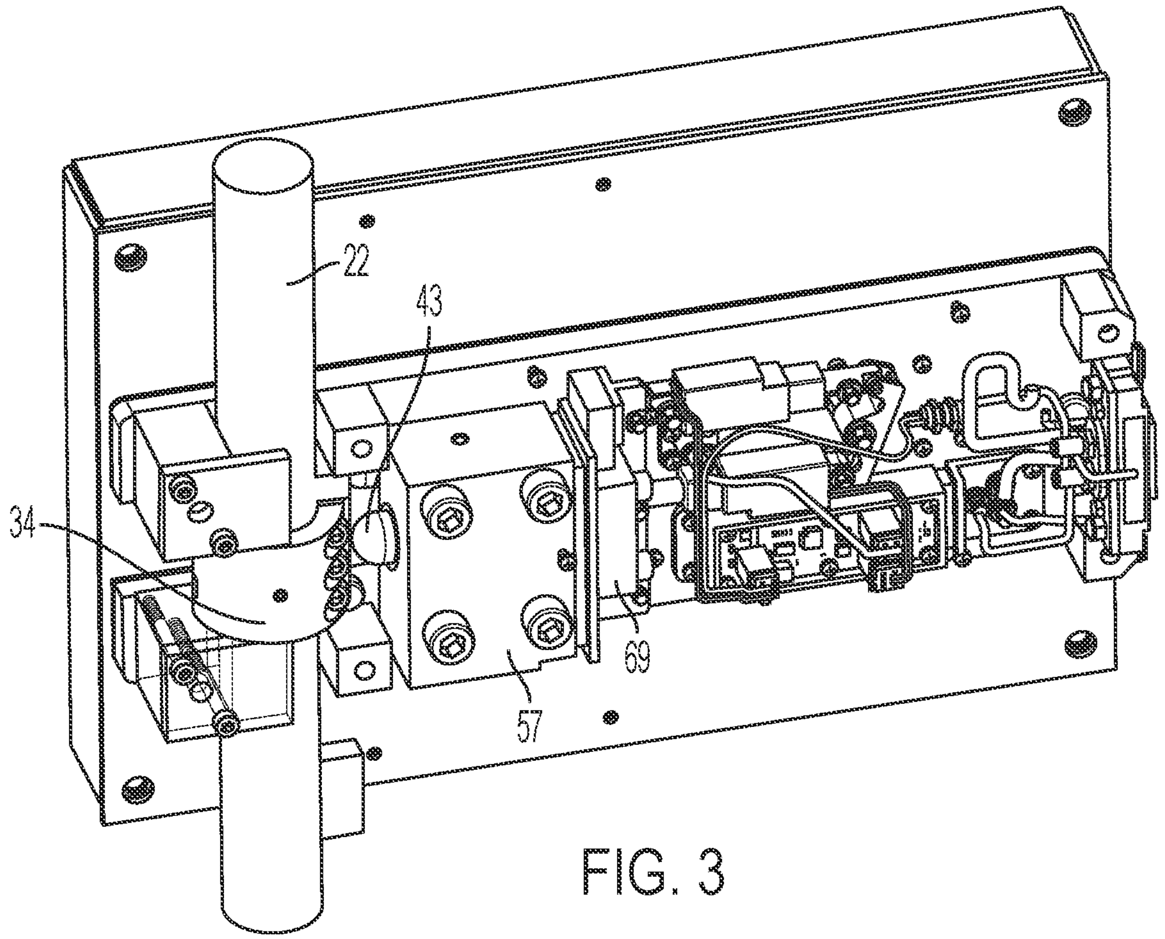
FIG. 3 is a front perspective of the electronic cargo container locking mechanism of FIG. 2, with the outside protective cover or housing removed.
Figure 4:
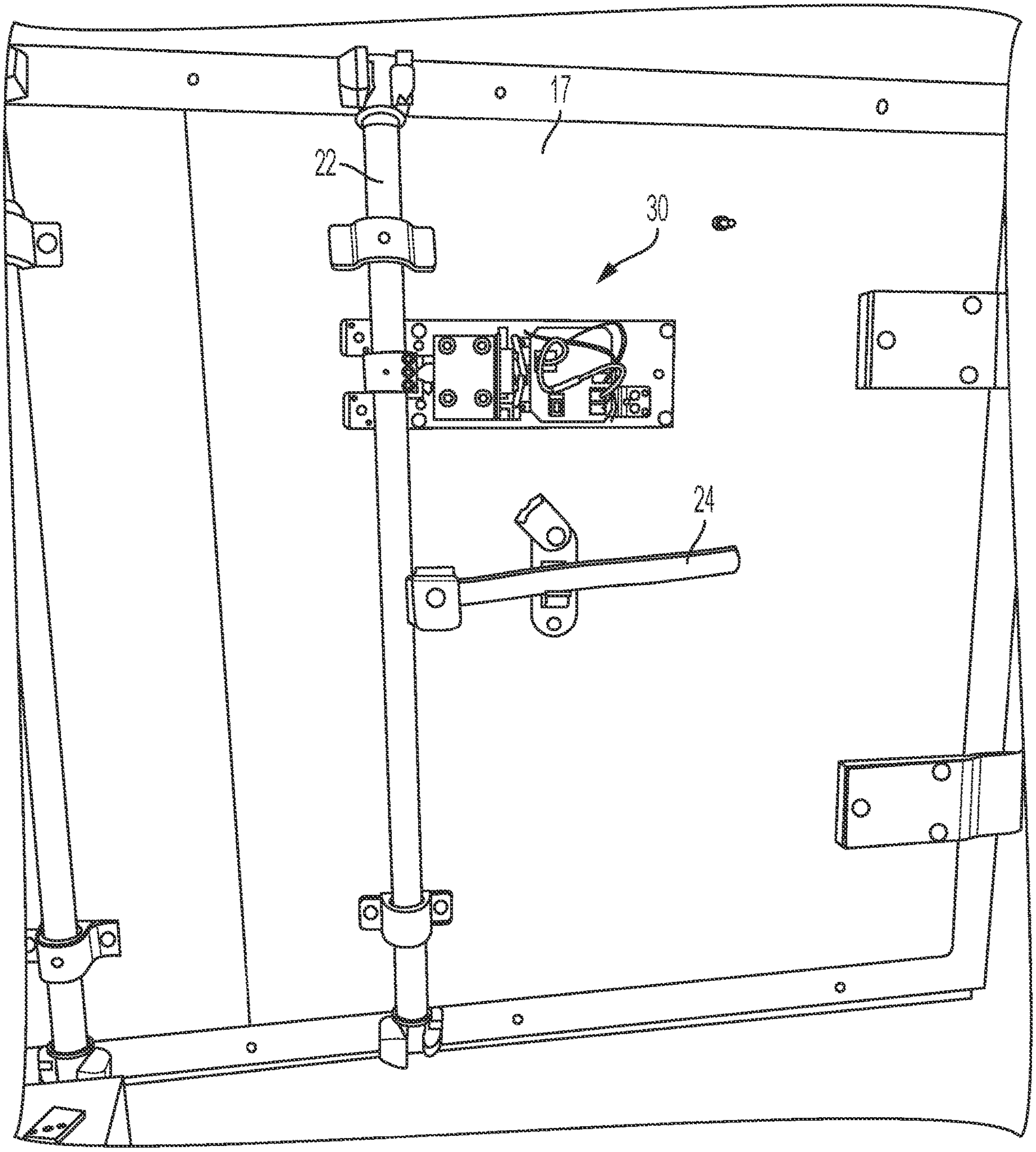
FIG. 4 is a front perspective view of a container door with the electronic cargo container locking mechanism of FIG. 2, with the protective cover and other portions removed.

FIGS. 2 to 17 illustrate the electronic cargo container locking mechanism 30 according to this disclosure in an embodiment intended for use with the door latching structure of FIG. 1. The electronic cargo container locking mechanism of this disclosure can also be used with a single door mounted in a door frame, as illustrated in FIG. 4. The locking mechanism of this disclosure is intended to be attached to a door 17 adjacent the vertical locking bar 22. Part of the locking mechanism is mounted on the outside of the swinging door, and part of the locking mechanism is mounted on the inside of the swinging door. Bolts 78 extend between these two parts and hold the locking mechanism 30 together on the door 17.

Figure 2:
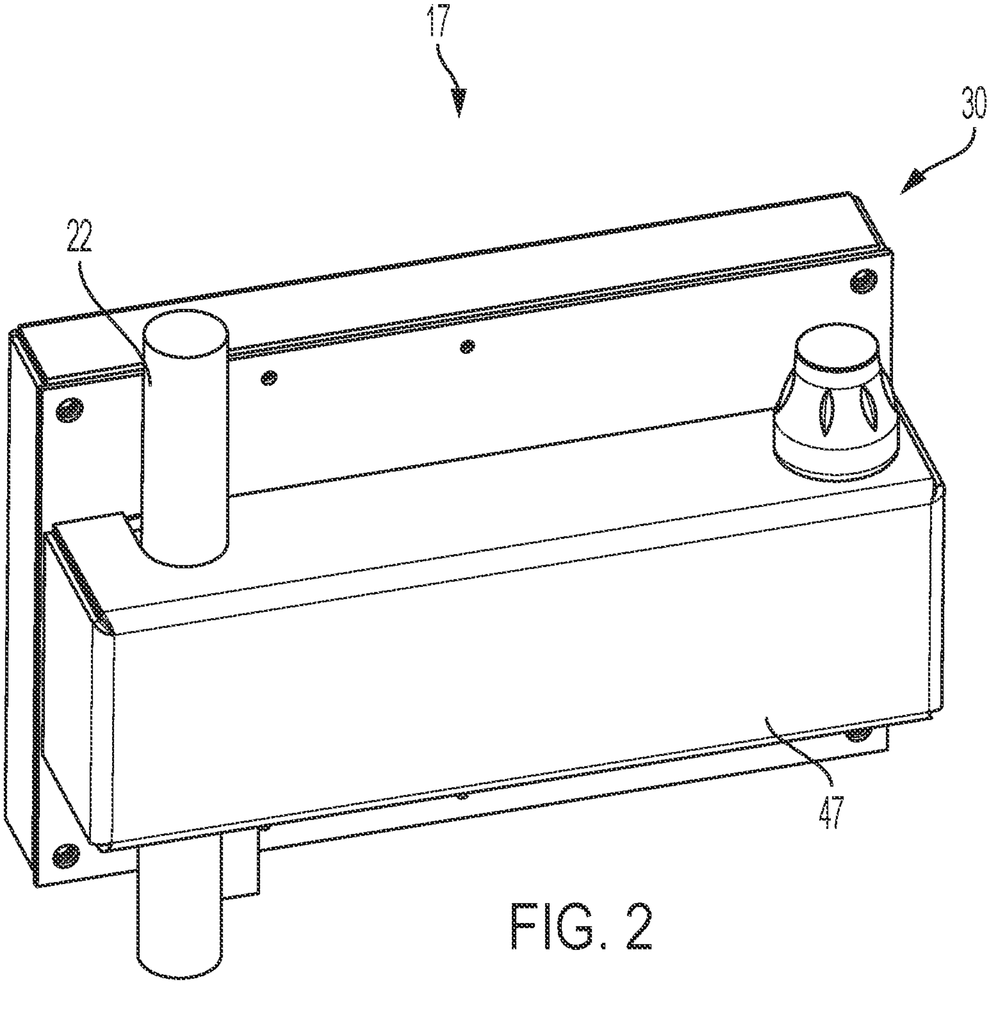
FIG. 2 is a front perspective view of an electronic cargo container locking mechanism according to this disclosure.
Figure 5:
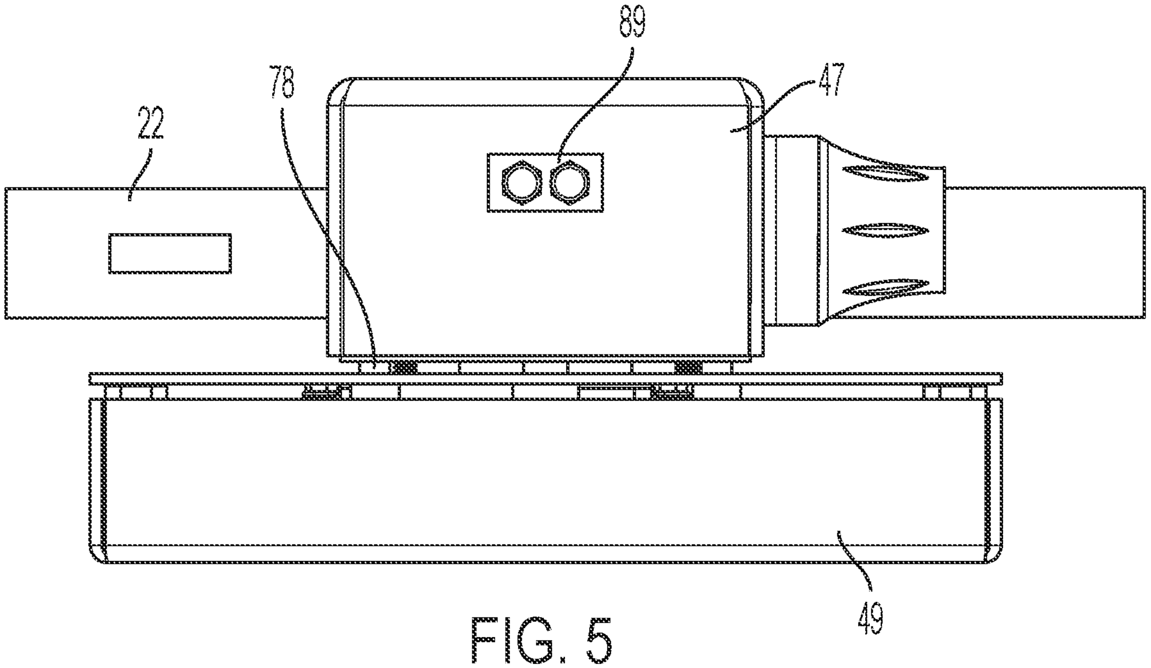
FIG. 5 is an end view of the electronic cargo container locking mechanism according to FIG. 2.
Figure 6:
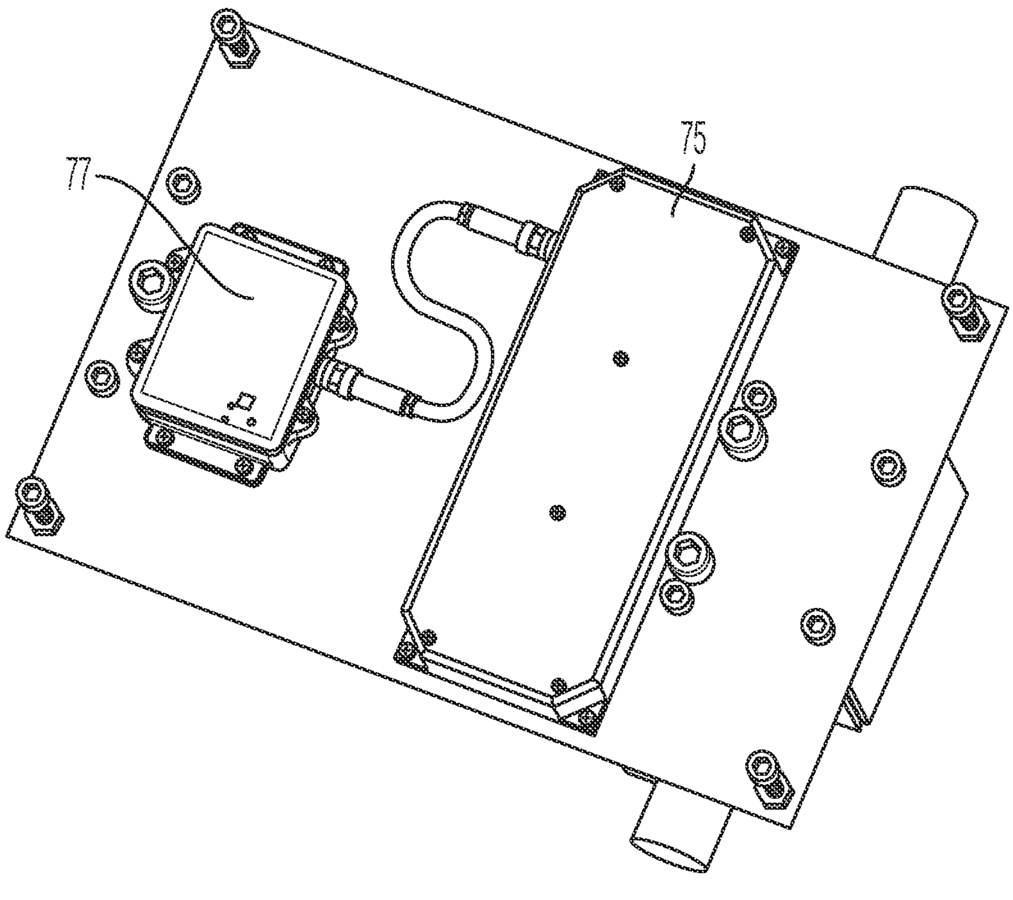
FIG. 6 is a rear perspective of the electronic cargo container locking mechanism of FIG. 2 with the inside protective cover or housing removed.
Figure 7:
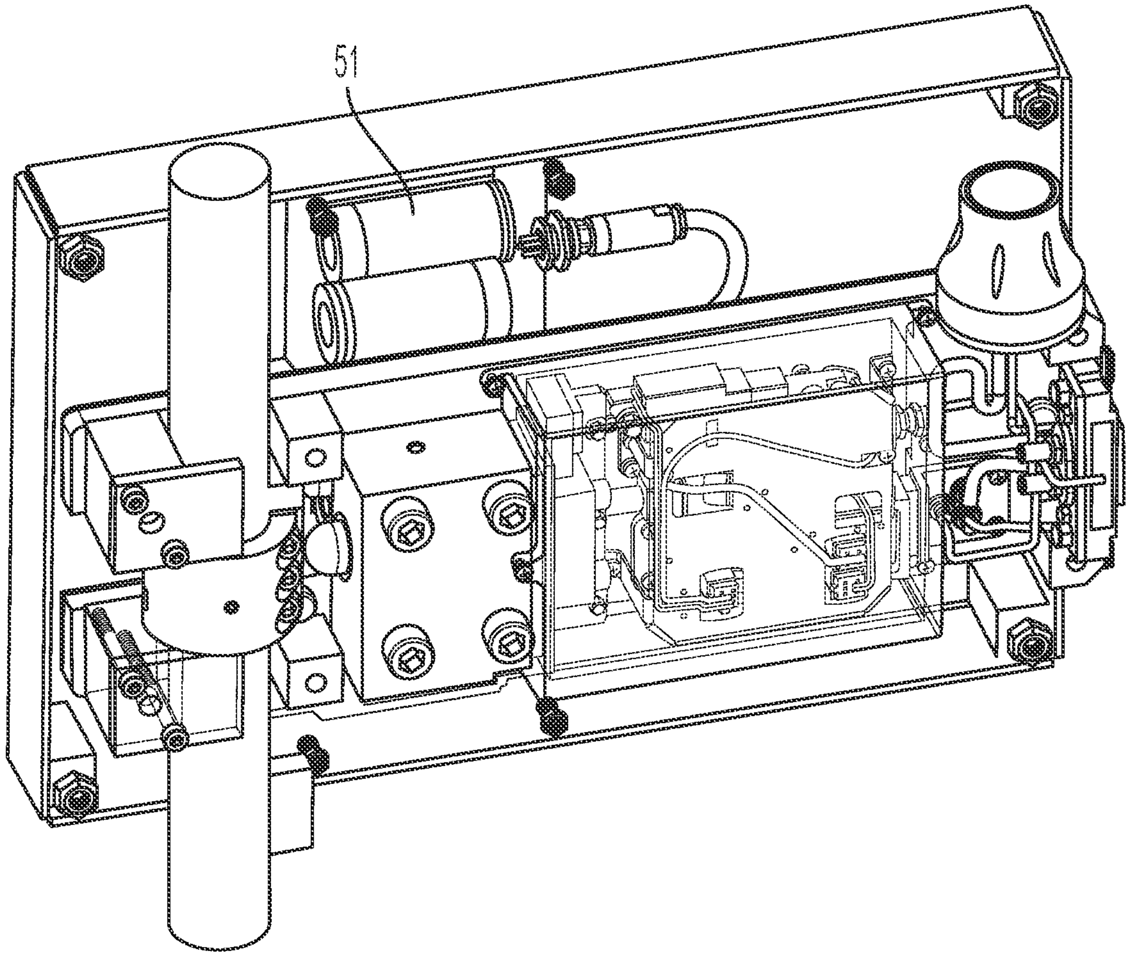
FIG. 7 is a front perspective view of the electronic cargo container locking mechanism of FIG. 2, with the protective cover removed and the cover between the front compartment and the rear compartment removed.
Figure 8:
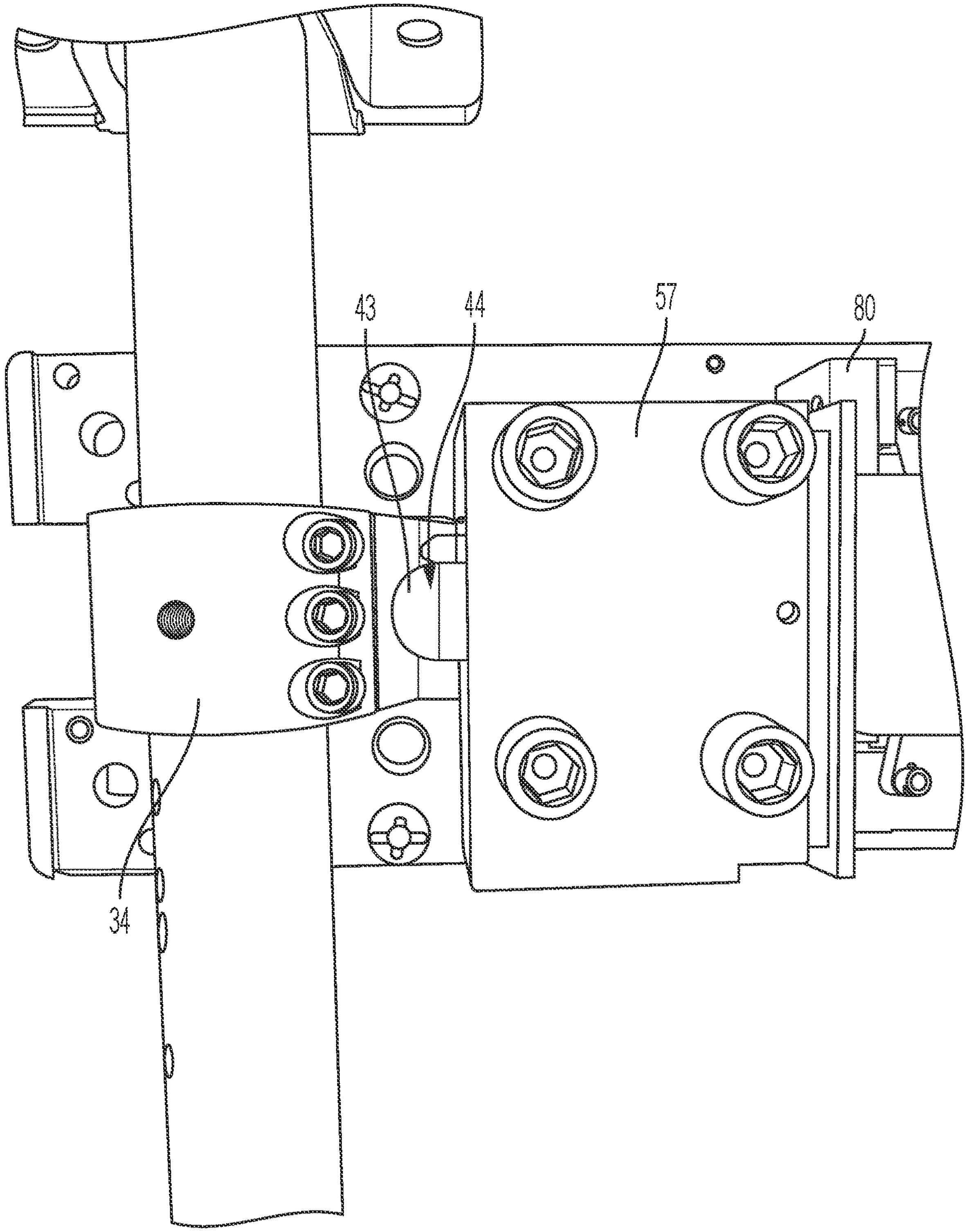
FIG. 8 is end enlarged front view of the bolt and cam portion of the electronic cargo container locking mechanism of this disclosure with the cam and bolt in the latch locked position.
Figure 9A:
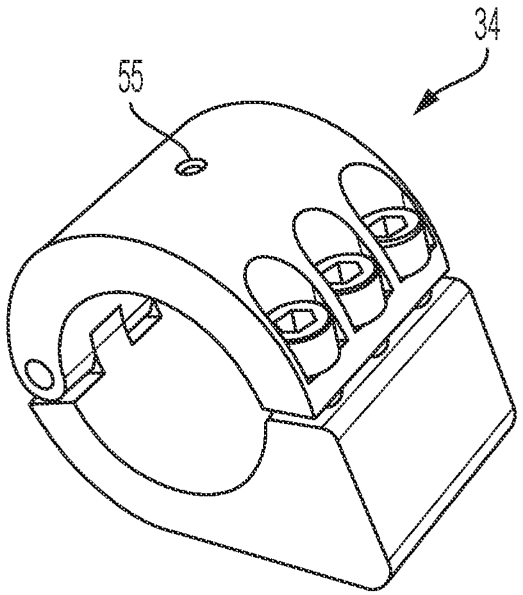
FIG. 9A is a side perspective view of a cam according to this disclosure.
Figure 9B:
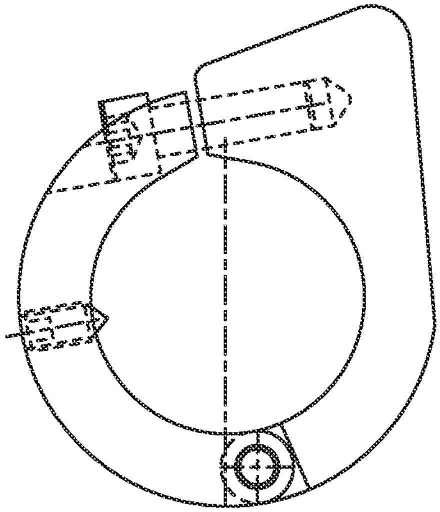
FIG. 9B is a cross sectional view through the cam of FIG. 9A.
Figure 9C:
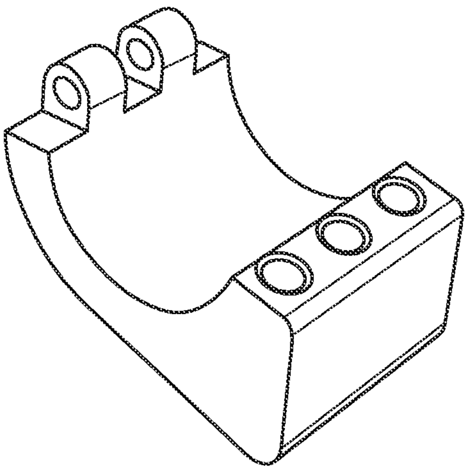
FIG. 9C is an end perspective view the bottom half of the cam of FIG. 9A.
Figure 9D:
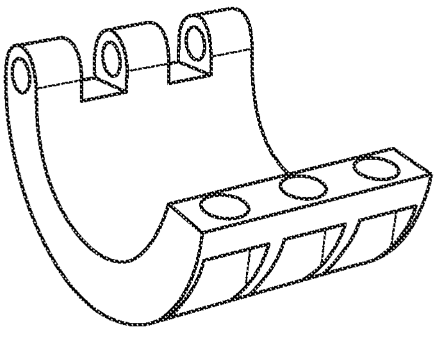
FIG. 9D is an end perspective view of the top half of the cam of FIG. 9A.
Figure 10:
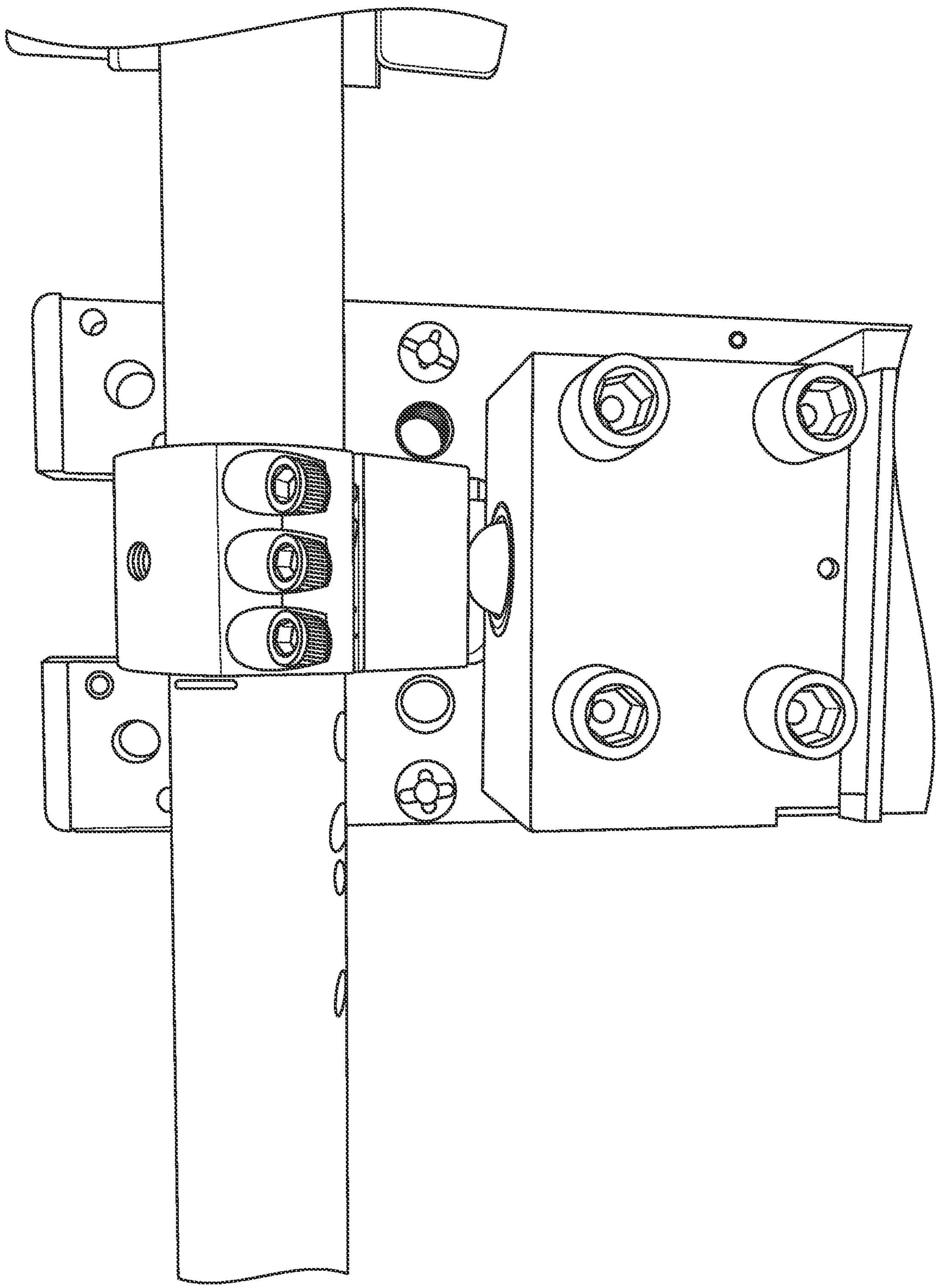
FIG. 10 is a view like FIG. 8 only with the cam forcing the bolt into a retracted position.
Figure 11:
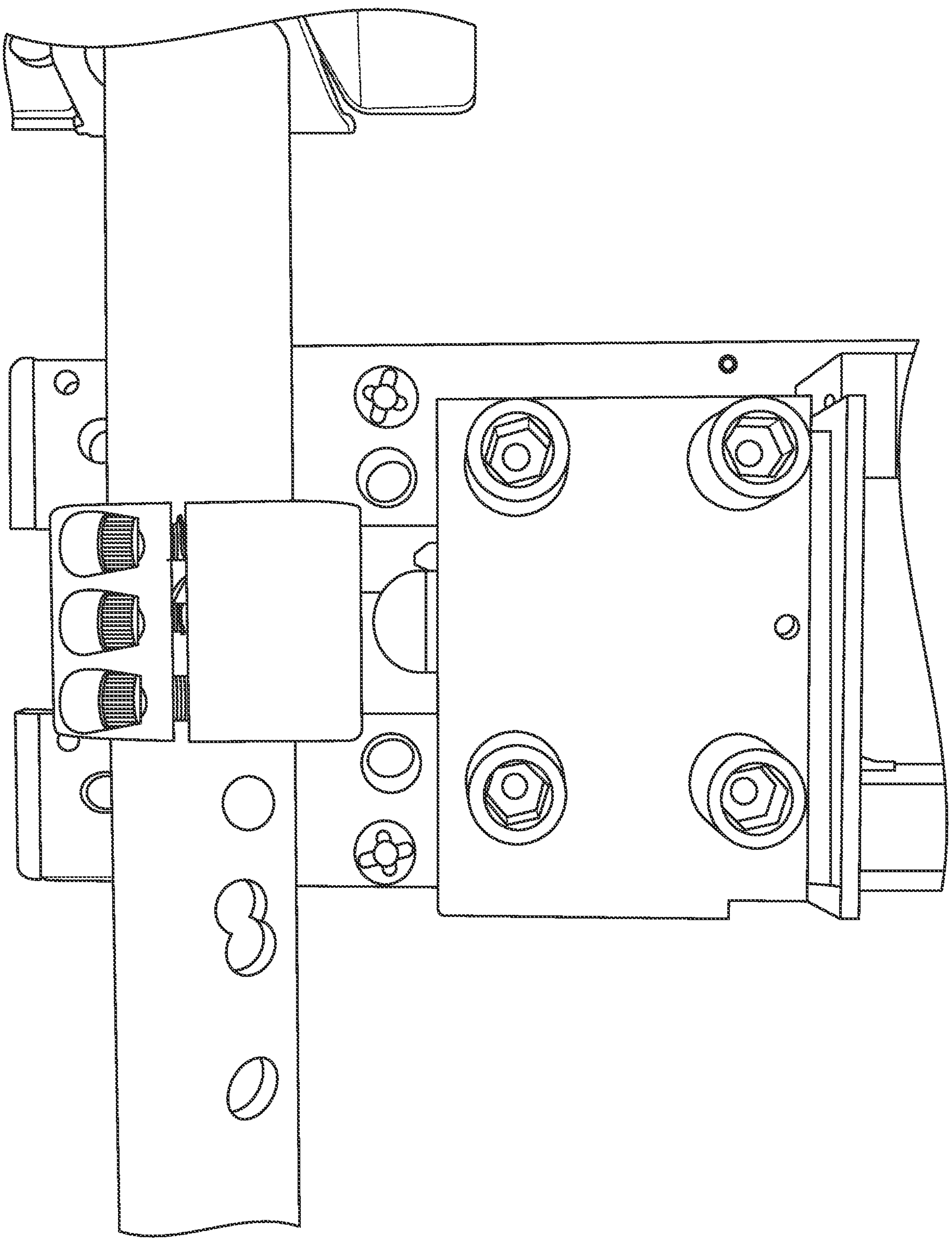
FIG. 11 is the views like FIG. 8 only showing the cam rotated past the bolt with the vertical locking bar now able to be rotated to a door unlocked position.
Figure 12A:
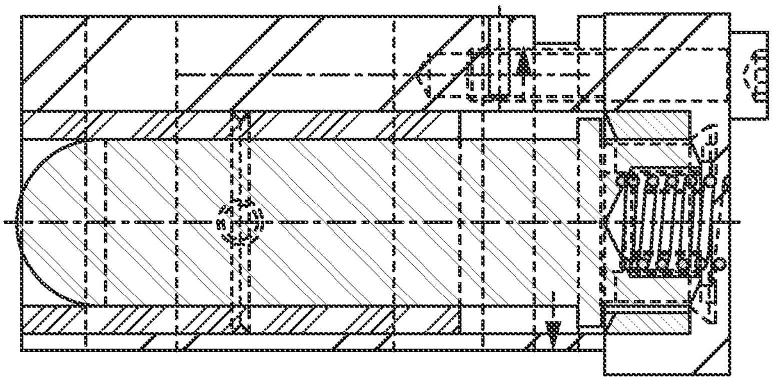
FIGS. 12A and 12B illustrate the retracted and extended positions of the bolt, respectively.
Figure 12B:
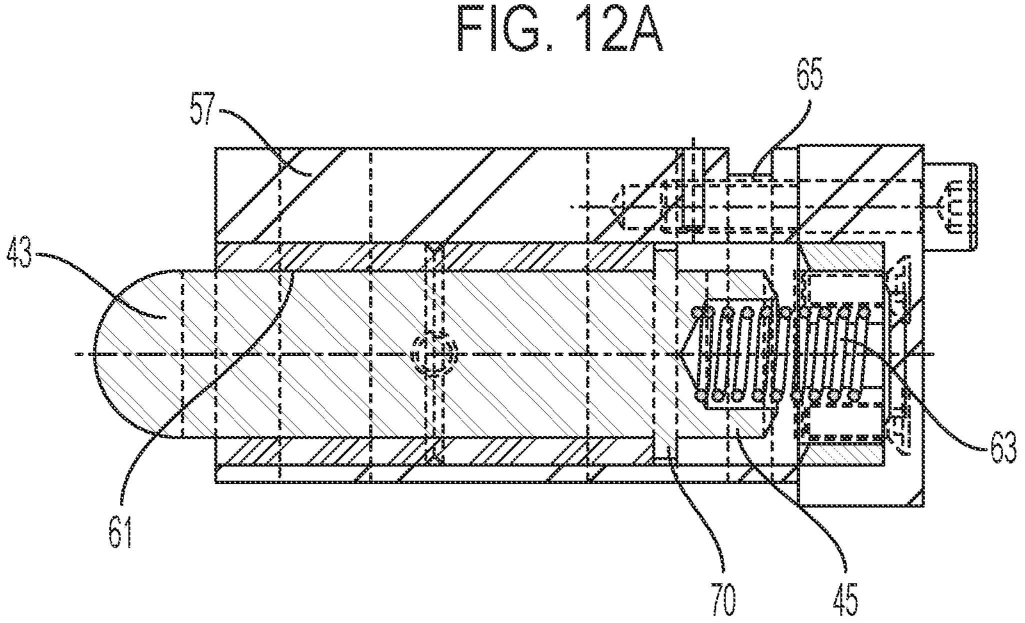
Figure 13:
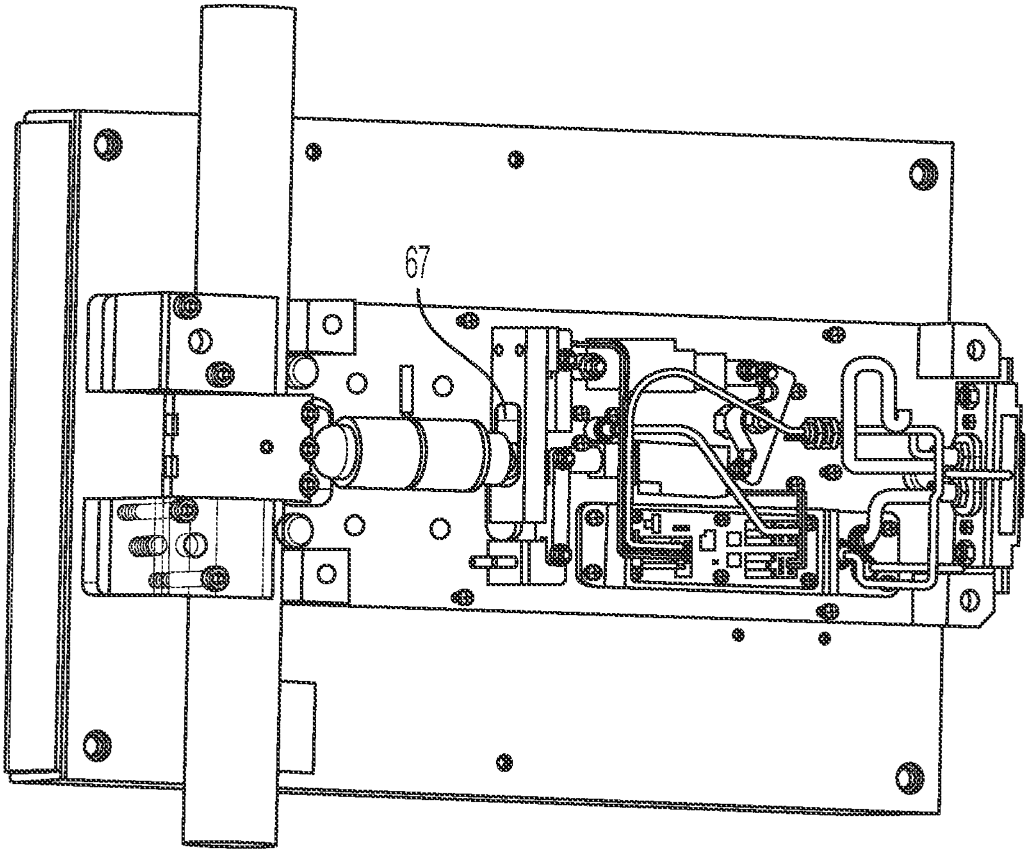
FIG. 13 is a front perspective of the electronic cargo container locking mechanism of FIG. 2 with portions removed to illustrate the bolt locking plate and the linear actuators.
Figure 14:
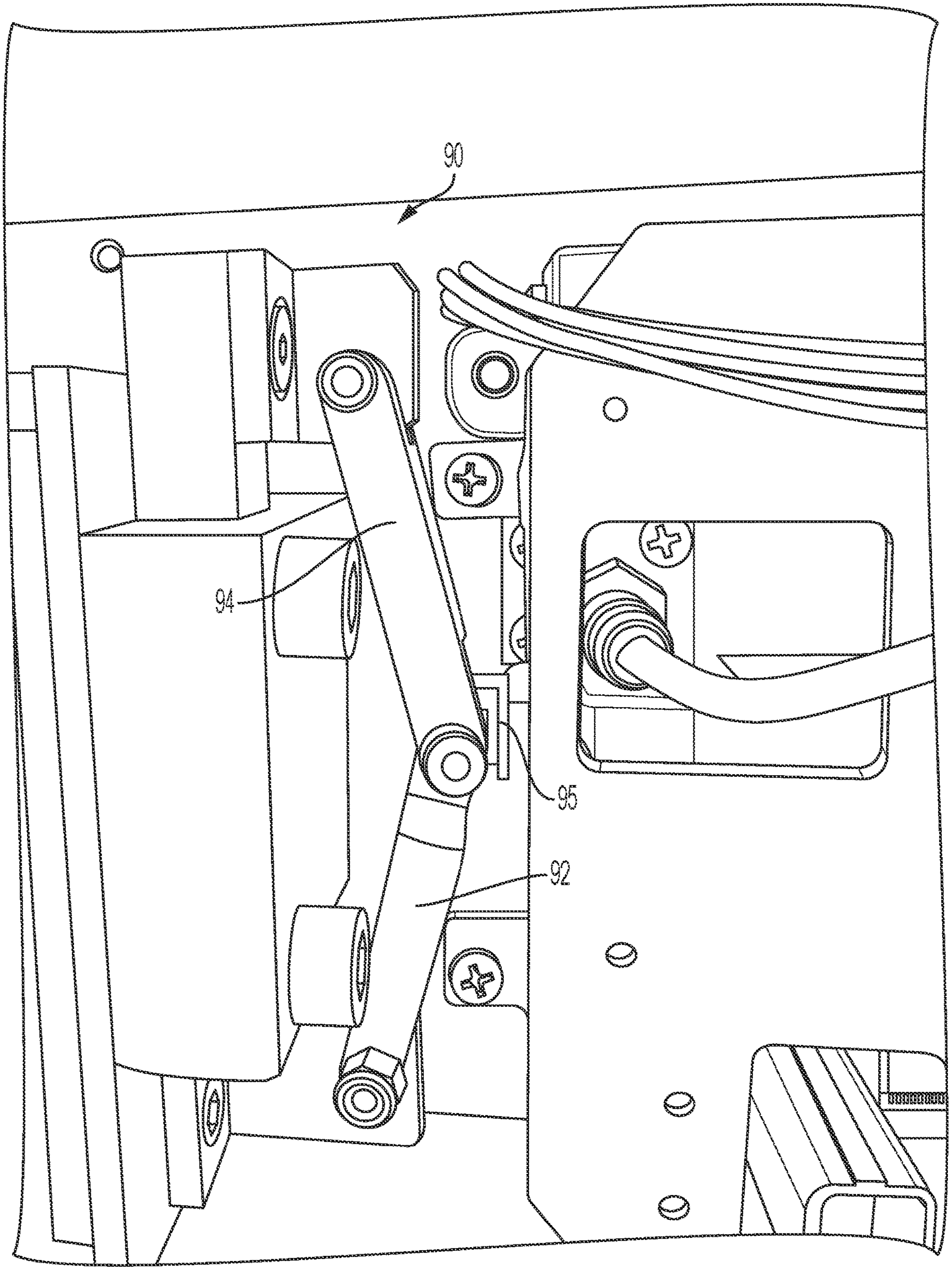
FIG. 14 is an enlarged view of the mechanism used for moving the bolt locking plate.
Figure 15:
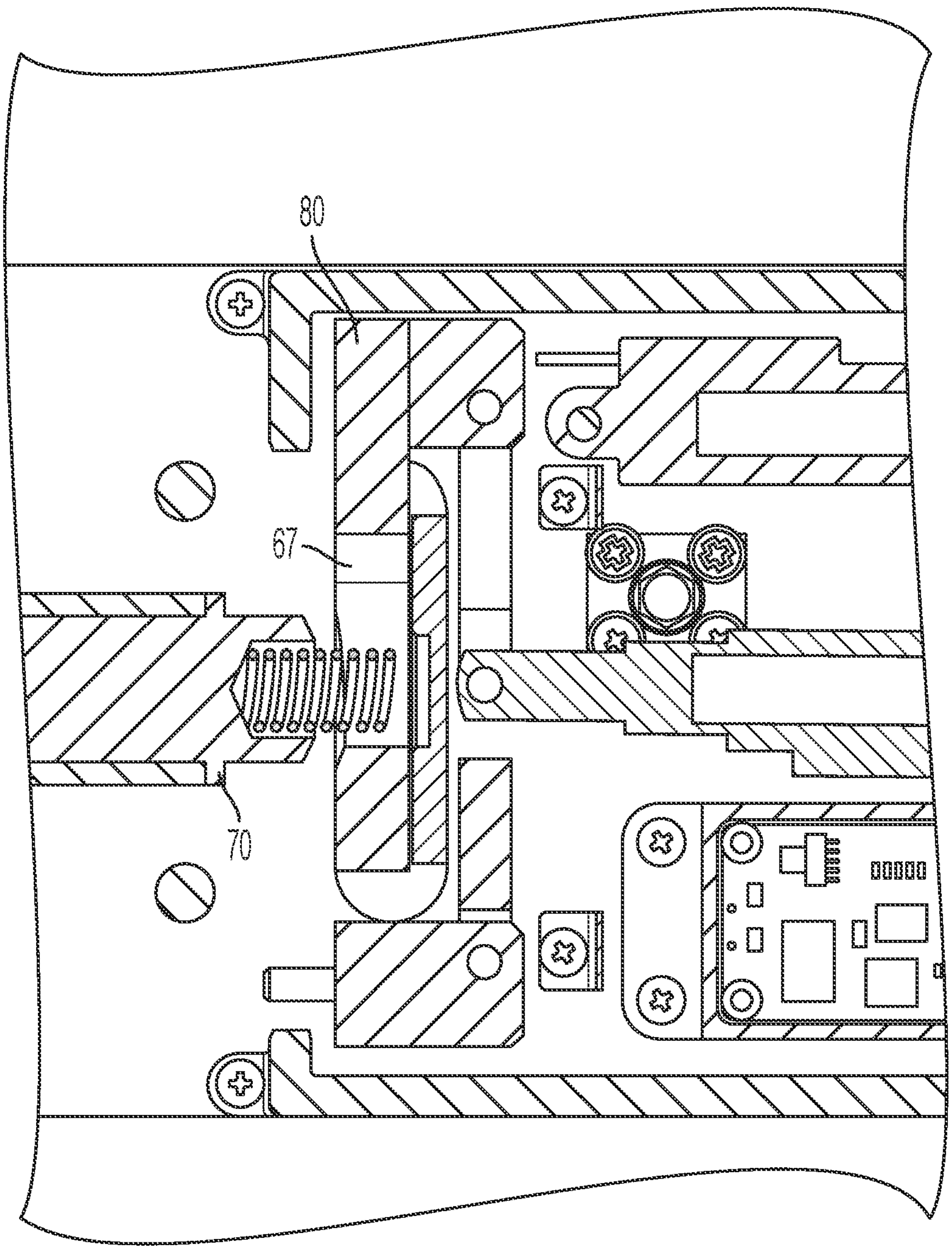
FIG. 15 is a cross-sectional view illustrating the bolt, the bolt spring, the locking plate and portions of the locking plate link mechanism and linear actuators.
Figure 16A:
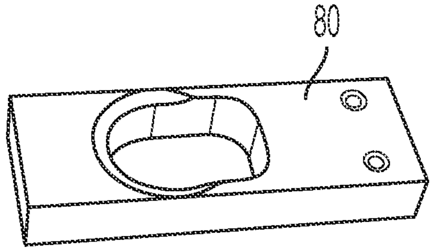
FIG. 16A is a top perspective view of the bolt locking plate.
Figure 16B:
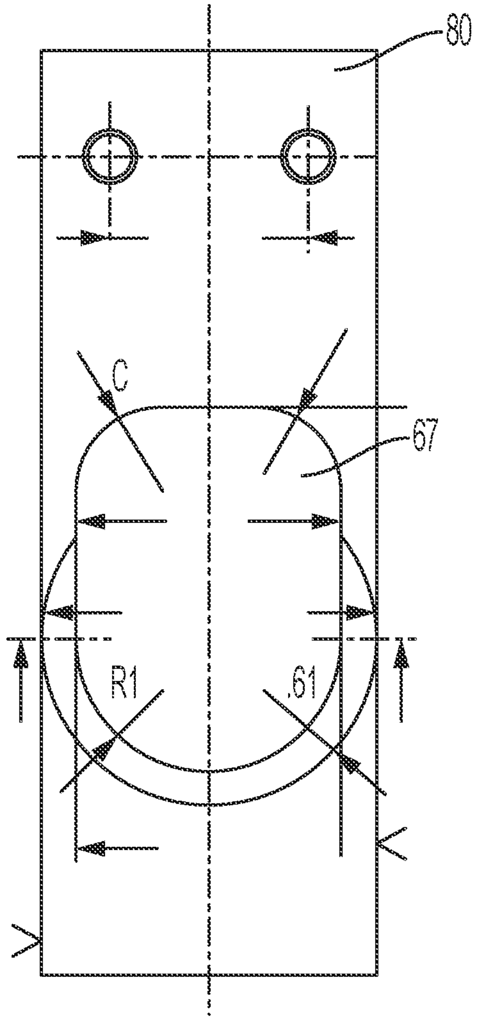
FIG. 16B is a top view of the bolt locking plate.
Figure 16C:
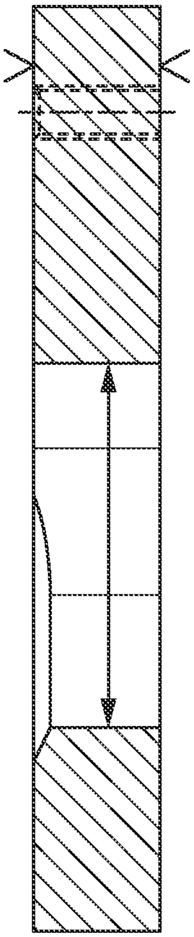
FIG. 16C is a side cross sectional view of the bolt locking plate.
Figure 17:
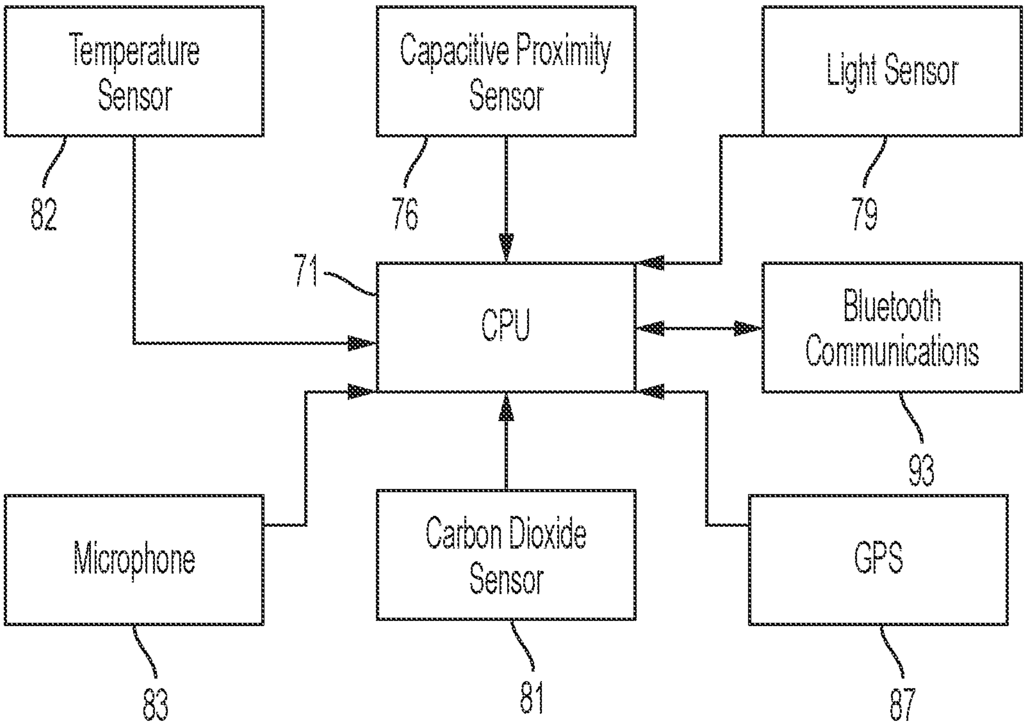
FIG. 17 is a schematic illustration of the various sensors and devices located in the electronic cargo container locking mechanism and inside the container, as well as the main circuit board central processing unit located outside the container.

FIG. 2 illustrates the locking mechanism 30 mounted on the outside of the swinging door 17, with a portion of the vertical locking bar 22 passing through the locking mechanism 30. In FIG. 3, the outside housing 47 has been removed, exposing the portion of the vertical bar 22 that passes through the locking mechanism 30. FIG. 5 is a side view of the locking mechanism 30, without a door between the inside housing 49 and the outside housing 47, Illustrating the outside housing 47 attached to the inside housing 49. FIG. 6 illustrates the back of the locking mechanism 30, with the inside housing 49 removed to show a battery pack 75 and a sensor unit 77. FIG. 7 illustrates the battery unit mounted in the inside housing.

As shown in FIG. 3, the locking mechanism includes a cam 34 mounted on the vertical locking bar 22, a movable bolt device 40 including a bolt 44 adjacently the cam 34, a bolt locking and unlocking mechanism 50, a main circuit board 54, and an auxiliary circuit board 58. The door latching structure 20 and the cam 34 comprise a latch that engages a bolt first end 43, the latch preventing the door from opening if the cam 34 and the bolt first end 43 cannot move past one another, as further explained below.

The locking mechanism 30 includes an outside housing 47 that gets secured to the outside of the swinging door, and an inside housing 49 that gets secured to the inside of the swinging door on the other side of the door. The outside housing 47 is a sturdy housing and covers the cam 34 and the locking mechanism internal components. The inside housing 49 houses a battery pack 51 and sensors 77 for monitoring the interior of the cargo container, as illustrated in FIG. 6 and as explained below.

The locking mechanism 30 includes the two-piece clamshell type cam 34 that is adapted to be mounted on an existing conventional vertical locking bar 22. The hinged locking clamp 34 goes around the vertical locking bar 22 and is held in place by screws that pass through both halves of the cam 34. A setscrew 55 received in a hole in the cam secures the cam 34 to the locking bar 22.

The cargo door locking mechanism movable bolt 44 interacts with the cam 34 securely mounted on the vertical locking bar 22. When the vertical locking bar 22 is rotated by an operator using the handle 24, the cam 34 engages the bolt 44. If the bolt 44 cannot move, the cam 34 cannot pass past the bolt 44, thereby preventing the locking bar 22 from being moved to a door opening position. If the bolt 44 can move, the cam 34 pushes the bolt 44 out of its way so that the cam 34 can pass past the bolt 44, allowing the vertical locking bar 22 to be moved to the door opening position.

The movable bolt 44 is housed in a bolt housing 57 containing a bore 61 The movable bolt 44 is in the bore 61 and the movable bolt 44 has the first end 43 and a second end 45. A spring 63 is mounted in the bolt housing 57 between the bolt second end 45 and a portion of the bolt housing and biases the bolt 44 towards the bolt first end 43 and the cam 34. Since the bolt 44 is free to move within the bore 61, the bolt 44 can be pushed against the spring 63.

A locking plate 80 is movably mounted in a slot 65 in the bolt housing 57. The locking plate 80 includes a hole 67 which aligns with the bolt 44 in the bolt housing 57. If the locking plate hole 67 is so aligned with the bolt 44, the movable bolt 44 can move past the locking plate 80 to a door unlocked position. The locking plate 80 is slidably mounted in the bolt housing 57. When the locking plate 80 is slid a small amount, to a locking position, the locking plate 80 engages a flange 70 on the movable bolt 44, thereby preventing the bolt 44 from being free to move further into the locking plate hole 67.

The cargo door locking mechanism 30 requires very little energy to be operated because of the use of the locking plate to either limit movement of the movable bolt or to permit movement of the movable bolt. As a result, the locking mechanism can be used repeatedly over a typical 20-year lifecycle of a cargo container. As a result, one such electronic cargo container locking mechanism is all that is needed for the typical life of the cargo container.

Movement of the locking plate is accomplished by a link mechanism 90 attached to the locking plate. The link mechanism moves between a locking plate unlocked position and a locking plate locked position. The link mechanism includes a first link 92 secured at one end to the bolt housing. The first link is also pivotally attached at a second end to a second link 94 second end, the second link 94 also having a second link first end attached to the locking plate. The linking mechanism is moved by at least one linear actuator 95, such as an electric solenoid. In the disclosed embodiment, there are two connected such linear actuators. Operation of the linear actuators requires very little energy, thus permitting operation of the solenoid repeatedly over the life of the cargo container. The linking mechanism converts linear actuator movement in one direction into a perpendicular sliding movement of the locking plate and locking plate movement in an opposite direction with movement of the linear actuators in an opposite direction.

The backside of the locking mechanism includes the inside housing 49 that houses the batteries for the electronics and movable bolt mechanism, as well as the various sensors 77 and a central processing unit (CPU) 71. The sensors 77 are exposed to the inside of the cargo container 10 and are connected to the CPU 71 mounted on a main circuit board 73. The sensors 77 include a capacitive proximity sensor 76 that can detect a human body at short range, a temperature sensor 82, a light sensor 79, a carbon dioxide sensor 81, and a microphone 83. These various devices look for environmental changes within the cargo container. With the sensors 77 looking for environmental changes inside the cargo container, it is possible to find the presence of individuals who should not be there inside the container, as in the case of human trafficking, or if individuals are attempting to remove cargo when they are not supposed to.

The locking mechanism also includes a satellite-based radio navigation system unit (GPS) 87, and Bluetooth and cellular communication capabilities 93. All of these are connected to the CPU 71. Communication with appropriate authentication is therefore possible with remote devices (not shown) away from the locking mechanism. Such remote devices are the usual way to cause the unlocking of the locking mechanism by a received signal causing movement of the linear actuator 95.

The locking mechanism also includes an override auxiliary circuit board 85 which can be activated if the need arises, such as when the main circuit board 73 is powered off. A battery (not shown) with contacts is placed against a contact board 89 on the auxiliary circuit board 85, and after one minute of such contact, the auxiliary circuit board 85 unlocks the locking mechanism.

Various other features of this disclosure are set forth in the following claims.

The invention claimed is:

1. A locking mechanism for a swinging door movable between a door closed position and a door open position and including a latch, the locking mechanism including:

a bolt housing, a bolt in the bolt housing, the bolt being elongated and having a first end and an opposite second end, the bolt being movable axially in the bolt housing along its elongated length between a bolt locking position and a bolt unlocking position, a spring mounted in the bolt housing between the bolt second end and a portion of the bolt housing and biasing the bolt towards the bolt first end, a locking plate having a hole therein, the locking plate being slidably mounted in the bolt housing and movable between a locking plate unlocking position where the locking plate hole is aligned with the bolt so that the bolt can move freely towards the bolt second end, and a locking plate locking position where the locking plate hole is not aligned with the bolt and where the bolt movement toward the bolt second end is limited, and a locking plate moving mechanism for moving the locking plate between its locking plate locking position and its locking plate unlocking position, the latch engaging the bolt first end and preventing the door from opening if the latch and the bolt first end cannot move past one another, wherein the latch is a cam mounted on a vertical locking bar mounted on the door, and wherein the cam engages the bolt first end and moves it axially against the biasing spring as the cam rotates on the vertical locking bar so that the cam can pass past the bolt first end when the locking plate is in its unlocked position.

2. A locking mechanism for a swinging door movable between a door closed position and a door open position and including a cam mounted on a vertical locking bar mounted on the door, the locking mechanism including:

a bolt housing, a bolt in the bolt housing, the bolt being elongated and having a first end and an opposite second end, the bolt being movable axially in the bolt housing along its elongated length between a bolt locking position and a bolt unlocking position, a spring mounted in the bolt housing between the bolt second end and a portion of the bolt housing and biasing the bolt towards the bolt first end, the cam engaging the bolt first end and preventing the door from opening if the cam and the bolt first end cannot move past one another, wherein the cam engages the bolt first end and moves it axially against the biasing spring as the cam rotates on the vertical locking bar so that the cam can pass past the bolt first end when the bolt moves from its bolt locking position to its bolt unlocking position.

* * * * *